UNITED STATES PATENT OFFICE.

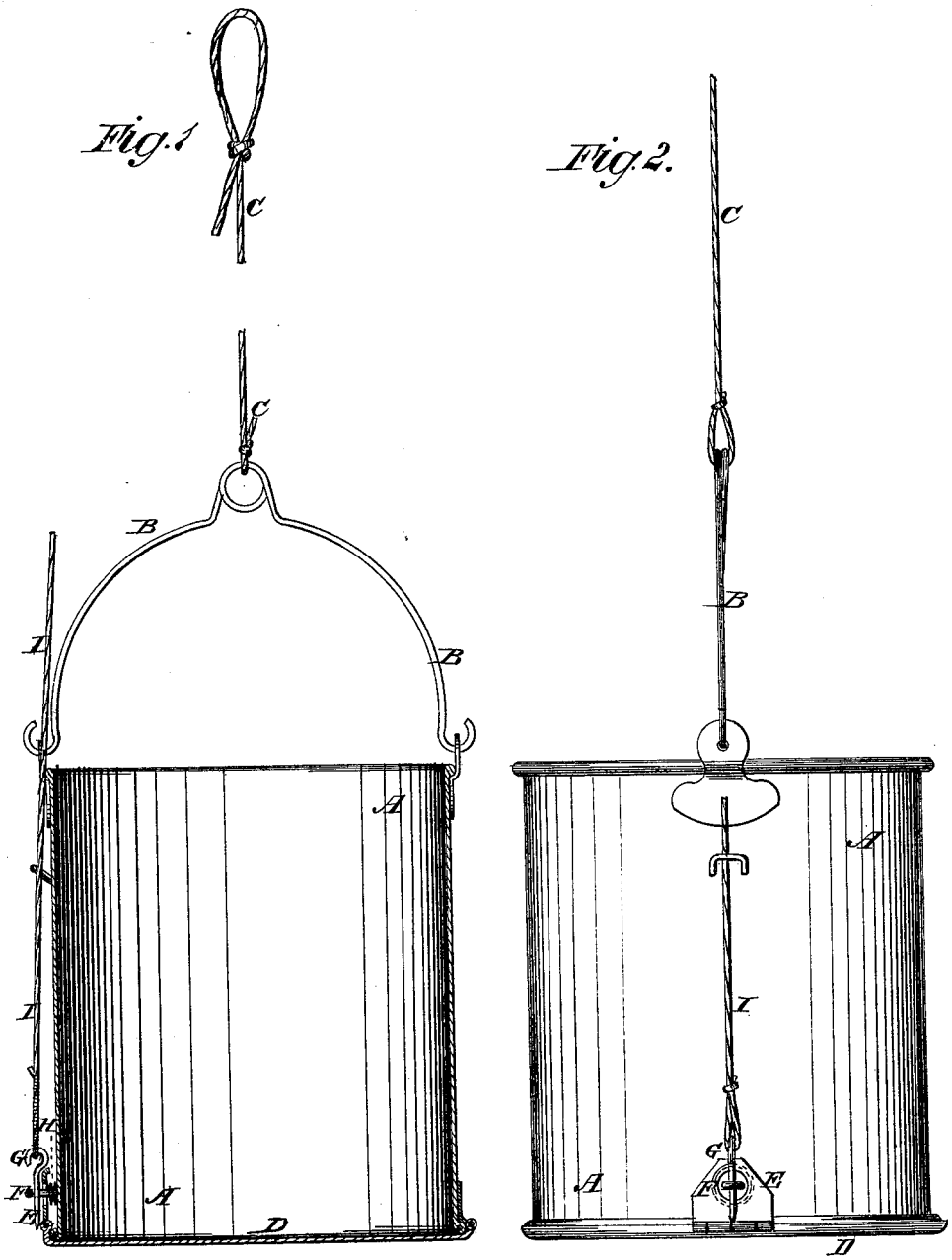

ORVILLE W. ODELL, OF WOODHULL, NEW YORK.

IMPROVEMENT IN FRUIT-PICKERS' BASKETS.

Specification forming part of Letters Patent No. 176,239, dated April 18, 1876; application filed March 21, 1876.

*To all whom it may concern:*

Be it known that I, ORVILLE W. ODELL, of Woodhull, Steuben county, New York, have invented a new and Improved Fruit-Picker's Bucket, of which the following is a specification:

Figure 1 is a vertical section of my improved bucket, and Fig. 2 is a side view of the same.

Similar letters of reference indicate corresponding parts.

The object of this invention is to furnish an improved bucket for use in picking fruit and for other uses, which shall be so constructed that the picker can lower his bucket and empty the fruit upon the ground, or into a barrel or other receiver, without coming down from the tree, and without injuring the fruit.

The invention consists in the hinged bottom, the hinged lug, the pin or staple, the spring, and two cords, in combination with the body and the bail of a bucket, as hereinafter fully described.

A represents the body of the bucket, which is provided with a bail, B, having an eye formed in its center to receive the cord C, by which the bucket is raised and lowered. The bucket A is provided with a loose bottom, D, which is hinged at one edge to the lower edge of the body A. To the other edge of the bottom D is hinged a lug, E, so that it may be turned up along the side of the body A. The lug E has a hole formed through it to pass over a pin or staple, F, attached to the body A, upon which it is secured by a pin, G, passed through a hole in the said pin or staple F. Upon the pin or staple F is placed a spring, H, by which, as soon as the pin G is withdrawn, the lug E is pushed off the said pin or staple F, allowing the bottom D to open and the fruit to escape. To the eye of the pin G is attached the end of a cord, I, the other end of which is connected with the end of the cord D. The cords D I are made of any desired length, according to the height of the tree or other place from which the fruit is to be lowered.

Having thus described my invention, I claim as new and desire to secure by Letters Patent—

The hinged bottom D, the hinged lug E, the pin or staple F, the pin G, the spring H, and the cords I and C, in combination with the body A and the bail B of a bucket, substantially as herein shown and described.

ORVILLE W. ODELL.

Witnesses:
H. MARLATT,
PETER MASTEN.